A. TEAL.
CUTTER MECHANISM.
APPLICATION FILED JUNE 2, 1908.

946,810.

Patented Jan. 18, 1910.

Inventor,
Albert Teal.
By C. A. Snow & Co.,
Attorneys.

Witnesses

UNITED STATES PATENT OFFICE.

ALBERT TEAL, OF DALLAS, OREGON.

CUTTER MECHANISM.

946,810.  Specification of Letters Patent.  Patented Jan. 18, 1910.

Application filed June 2, 1908. Serial No. 436,232.

*To all whom it may concern:*

Be it known that I, ALBERT TEAL, a citizen of the United States, residing at Dallas, in the county of Polk and State of Oregon, have invented a new and useful Cutter Mechanism, of which the following is a specification.

This invention has relation to cutter mechanisms for mowers and reapers and it consists in the novel construction and arrangement of its parts as hereinafter shown and described.

The object of the invention is to provide a mechanism of the character indicated which is of simple construction and which may be manipulated with an expenditure of a minimum amount of energy.

The mechanism consists primarily of a bar upon which is mounted a number of finger guards having peculiar relation to each other. A series of rotary cutters is also mounted upon the bar and means is provided for rotating the said cutters so that the alternate cutters rotate in the same direction and the adjacent cutters rotate in the opposite direction. The said cutters carry radially disposed blades which coöperate with the finger guards in severing the stalks of the grain. The said rotary cutters are mounted in such proximity to each other that the blades of one cutter intermesh with the blades of the other although the blades of one cutter do not actually engage the blades of the adjacent cutters. The finger guards are arranged upon the cutter bar so that their parts which are directly against the cutter bar are in parallel relation while their pointed ends are pitched at angles to each other. This disposition facilitates the process of cutting the grain as will hereinafter appear.

Figure 1:
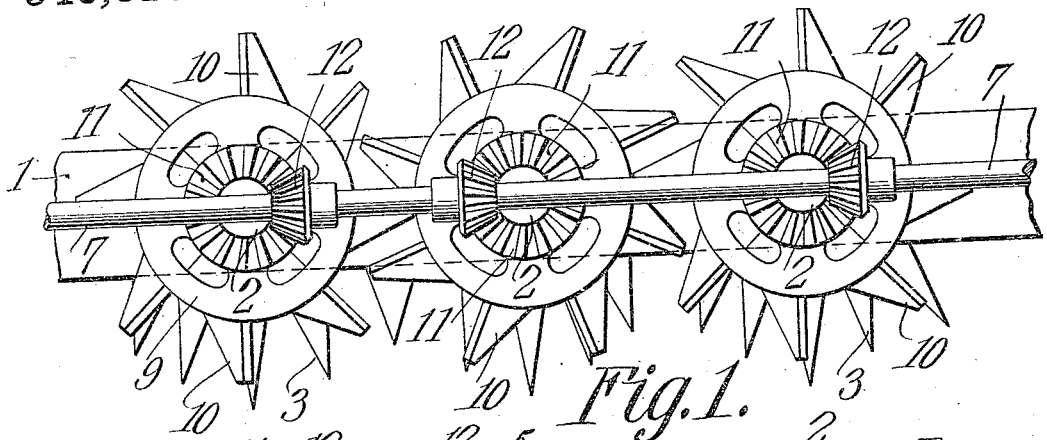
Figure 2:
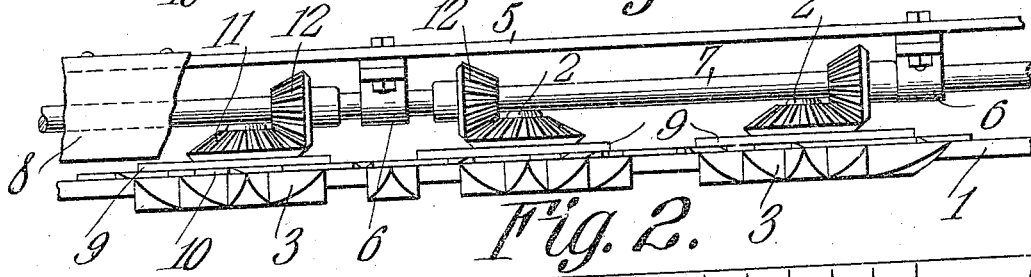
Figure 3:
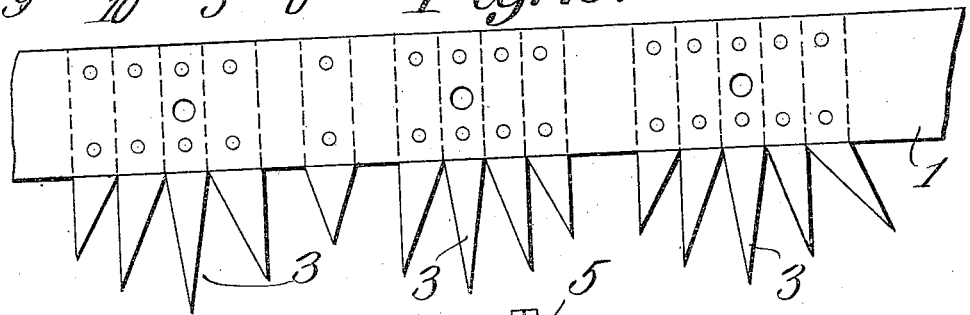
Figure 4:
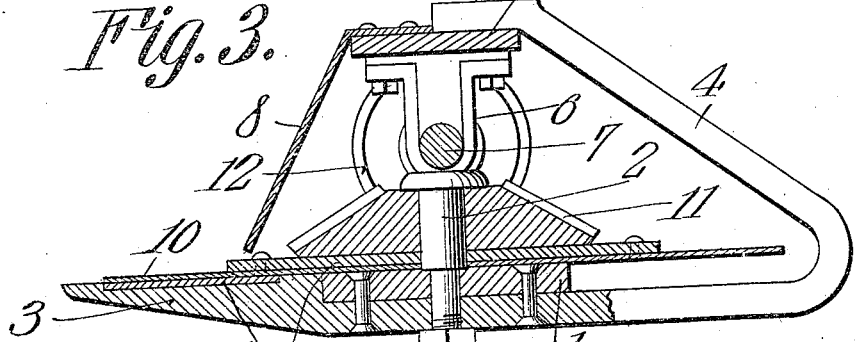

In the accompanying drawing:—Figure 1 is a top plan view of a portion of the cutter mechanism with parts removed. Fig. 2 is a front elevation of the cutter mechanism with parts broken away. Fig. 3 is a top plan view of a portion of the finger bar showing the arrangement of the guard fingers thereon, and Fig. 4 is a transverse sectional view of the cutter mechanism.

The mechanism consists of the finger bar 1 upon which is mounted at intervals the vertically disposed pintles 2. The guard fingers 3 are attached to the under side of the bar 1 and their forward pointed ends project beyond the forward edge of the said bar. Some of the guard fingers are provided at their rear ends with the bracket arms 4 as shown in Fig. 4 which pass beyond the rear edge of the bar 1 and then up over the top of the bar and the upper end portions of the said bracket arms support the superimposed frame bar 5. The bar 5 is in parallel relation to the bar 1 and supports at intervals the bearings 6. The shaft 7 is journaled for rotation in the bearings 6 and lies between the bars 1 and 5. The guard plate 8 is supported upon the bar 5 and is inclined downwardly and forwardly over the bar 1. The disks 9 are journaled for rotation upon the pintles 2 and the radially disposed blades 10 are carried by the said disks 9. The beveled pinions 11 are mounted upon the upper sides of the disks 9 and mesh with the beveled pinions 12 mounted upon the shaft 7.

By reference to Fig. 1 of the drawing, it will be seen that the cutting edges of the blades of adjacent disks are oppositely disposed. That is to say the cutting edges of the blades mounted upon one of the disks 9 are disposed in the opposite direction from the cutting edges of the blades upon the next adjacent disks. Also the beveled pinion 12 meshes with one of the beveled pinions 11 at one side thereof and the next adjacent beveled pinion 12 meshes with the corresponding beveled pinion 11 at the opposite side thereof. This is for the purpose of causing each alternate rotary cutting member throughout the series to rotate in the same direction while the intervening members rotate in the opposite direction. By reference to Fig. 1 of the drawing it will also be seen that the cutting blades of the rotary members intermesh with those blades of the adjacent members but that they do not actually have contact with each other.

Those portions of the guard fingers 3 which are directly adjacent the under side of the bar 1 are in parallel relation while the longitudinal axes of the pointed end portions of the said guard fingers are disposed at angles to each other. That is to say that the pointed end portion of one of the guard fingers is at an angle to the longitudinal axis of the same portion of the next adjacent guard finger. This disposition of the outer portions of the guard fingers is such as to facilitate the cutting of the grain while the cutting blades carried by the disks 9 rotate over the pointed end portions of the guard fingers. The pointed end portions of the guard fingers may be provided with ledger plates 13 as shown in Fig.4 or they may be devoid of such plates if desired.

The operation of the cutter mechanism is as follows: The shaft 7 is in a state of rotation and as the said shaft rotates rotary movement is transmitted from the same through the intermeshing beveled pinions 12 plate 11 to the disks 9 of which the alternate ones rotate in the same direction and the intermediate disks rotate in the opposite direction. As the said disks rotate they carry around the cutting blades 10 as above indicated and as the said blades sweep over the upper surfaces of the guard fingers 3 the stalks of the standing grain are severed. The guard plate 8 prevents the said grain after it has been severed from becoming entangled with the mechanisms located below the bar 5. By reason of the fact that the blades of the adjacent rotary cutting members intermesh but do not have actual contact with each other the said parts may be compactly arranged along the finger bar 1 and inasmuch as the cutting operation throughout the series of rotating cutting members is alternately in the opposite direction the thrust or strain incident to the separating of the grain stalks will be somewhat divided or distributed in opposite directions and consequently the stress upon the cutting mechanism is in a measure equalized.

Having described my invention what I claim as new and desire to secure by Letters-Patent is:—

A cutter mechanism embodying a finger bar, a frame bar arranged thereabove, guard fingers secured to the finger bar, certain of which are provided with a bracket arm to which the frame bar is bolted and is held in parallelism with the finger bar, said bracket arm extending rearwardly from the finger-bar and then forwardly and upwardly, shafts carried by the finger bar, disks journaled upon the shafts, knives secured to the disks, bevel gears journaled on the shafts and to which the disks are secured, bearings bolted to and depending from the frame bar, a driving shaft journaled in the bearings, and bevel gears carried by the shaft and meshing with the gears on the disks.

In testimony that I claim the foregoing as my own, I have hereto affixed my signature in the presence of two witnesses.

ALBERT TEAL

Witnesses:
  Hort C. Eakin,
  J. E. Sibley.